(12) United States Patent
Fallon

(10) Patent No.: US 11,132,175 B2
(45) Date of Patent: Sep. 28, 2021

(54) MULTI-DIMENSIONAL REFERENCE ELEMENT FOR MIXED REALITY ENVIRONMENTS

(71) Applicant: METRIK LLC, San Francisco, CA (US)

(72) Inventor: Keara Elizabeth Fallon, San Francisco, CA (US)

(73) Assignee: METRIK LLC

( * ) Notice: Subject to any disclaimer, the term of this patent is extended or adjusted under 35 U.S.C. 154(b) by 0 days.

(21) Appl. No.: 16/457,771

(22) Filed: Jun. 28, 2019

(65) Prior Publication Data

US 2019/0324720 A1 Oct. 24, 2019

Related U.S. Application Data

(63) Continuation of application No. 16/043,012, filed on Jul. 23, 2018, now Pat. No. 10,387,113, which is a
(Continued)

(51) Int. Cl.
*G06F 3/16* (2006.01)
*G06F 3/01* (2006.01)
(Continued)

(52) U.S. Cl.
CPC ............... *G06F 3/167* (2013.01); *G06F 3/012* (2013.01); *G06F 3/016* (2013.01);
(Continued)

(58) Field of Classification Search
CPC .......... G06F 3/167; G06F 3/012; G06F 3/016; G06F 3/04815; G06T 19/20; G10L 15/1815
(Continued)

(56) References Cited

U.S. PATENT DOCUMENTS 9,210,413 B2 12/2015 Grinberg et al.
9,282,309 B1 3/2016 Cosic
(Continued)

OTHER PUBLICATIONS

Notice of Allowance for U.S. Appl. No. 16/012,521 by USPTO dated Jan. 28, 2020.
(Continued)

*Primary Examiner* — Hai Tao Sun
(74) *Attorney, Agent, or Firm* — Platinum Intellectual Property LLP

(57) ABSTRACT

Approaches provide for controlling, managing, and/or otherwise interacting with mixed (e.g., virtual and/or augmented) reality content in response to input from a user, including voice input, device input, among other such inputs, in a mixed reality environment. For example, a mixed reality device, such as a headset or other such device can perform various operations in response to a voice command or other such input. In one such example, the device can receive a voice command and an application executing on the device or otherwise in communication with the device can analyze audio input data of the voice command to control the view of content in the environment, as may include controlling a user's "position" in the environment. The position can include, for example, a specific location in time, space, etc., as well as directionality and field of view of the user in the environment. A reference element can be displayed as an overlay to the mixed reality content, and can provide a visual reference to the user's position in the environment.

18 Claims, 10 Drawing Sheets

Related U.S. Application Data continuation of application No. 15/594,370, filed on May 12, 2017, now Pat. No. 10,042,604.

(60) Provisional application No. 62/357,824, filed on Jul. 1, 2016.

(51) Int. Cl.
*G06T 19/20* (2011.01)
*G06F 3/0481* (2013.01)
*G10L 15/18* (2013.01)
*G10L 15/22* (2006.01)

(52) U.S. Cl.
CPC .......... *G06F 3/04815* (2013.01); *G06T 19/20* (2013.01); *G10L 15/1815* (2013.01); *G10L 15/22* (2013.01); *G10L 2015/223* (2013.01)

(58) Field of Classification Search
USPC ........................................................ 345/633
See application file for complete search history.

(56) References Cited

U.S. PATENT DOCUMENTS

| | | | |
|---|---|---|---|
| 9,818,228 B2 | 11/2017 | Lanier et al. | |
| 10,042,604 B2 | 8/2018 | Fallon et al. | |
| 2008/0276178 A1* | 11/2008 | Fadell ................... | G06F 3/0481 |
| | | | 715/733 |
| 2010/0064239 A1 | 3/2010 | Crawford et al. | |
| 2013/0117377 A1 | 5/2013 | Miller | |
| 2014/0002496 A1* | 1/2014 | Lamb .................... | G06T 19/006 |
| | | | 345/633 |
| 2014/0098137 A1* | 4/2014 | Fein ......................... | G06T 11/60 |
| | | | 345/633 |
| 2014/0184496 A1 | 7/2014 | Gribetz et al. | |
| 2015/0081294 A1 | 3/2015 | Hsu et al. | |
| 2017/0354883 A1 | 12/2017 | Benedetto et al. | |
| 2018/0318716 A1 | 11/2018 | Benedetto | |

OTHER PUBLICATIONS

USPTO Non-Final Office Action dated Dec. 27, 2018, for U.S. Appl. No. 16/043,012, filed Jul. 23, 2018, 8 pages.

* cited by examiner

MULTI-DIMENSIONAL REFERENCE ELEMENT FOR MIXED REALITY ENVIRONMENTS

CROSS-REFERENCES TO RELATED APPLICATIONS

This application is a continuation of U.S. application Ser. No. 16/043,012, entitled "MULTI-DIMENSIONAL REFERENCE ELEMENT FOR MIXED REALITY ENVIRONMENTS," filed Jul. 23, 2018, which is a continuation of, and claims priority to, U.S. application Ser. No. 15/594,370, entitled "MULTI-DIMENSIONAL REFERENCE ELEMENT FOR MIXED REALITY ENVIRONMENTS," filed May 12, 2017, which is a continuation of, and claims priority to, U.S. Application No. 62/357,824, entitled "TRANSPORT CONTROLLER FOR VIRTUAL ENVIRONMENTS," filed Jul. 1, 2017; and is related to co-pending U.S. patent application Ser. No. 16/012,521, entitled "MULTI-DIMENSIONAL REFERENCE ELEMENT FOR MIXED REALITY ENVIRONMENTS", filed Jun. 19, 2018 which the full disclosure of these applications is incorporated herein by reference for all purposes.

BACKGROUND

Mixed (e.g., augmented and/or virtual) reality devices, such as headsets or goggles, are rapidly developing to the point where these devices should soon be widely available for various consumer applications. For example, mixed reality headsets that display images of a mixed reality environment have been demonstrated at various events and application developers are preparing for their upcoming release. One issue that persists, however, is interacting with media within the context of the mixed reality environment. While conventional approaches utilize hand, head, and eye tracking, such approaches can difficult to implement, cost prohibitive, or work within limited specifications, under certain light conditions, and other such problems. What is needed is a system and method for interacting with media content within the context of a mixed reality environment.

BRIEF DESCRIPTION OF THE DRAWINGS

Various embodiments in accordance with the present disclosure will be described with reference to the drawings, in which.

DETAILED DESCRIPTION

Figure 1A:
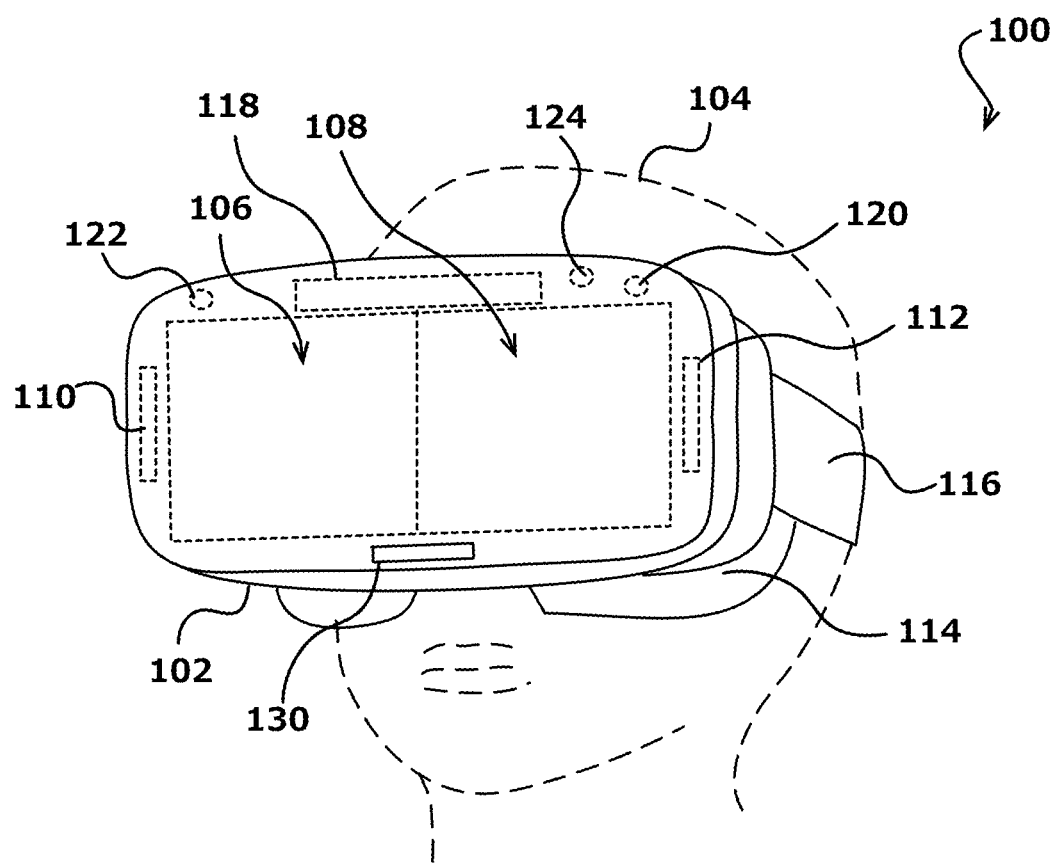
FIGS. 1A and 1B illustrates an example system for interacting with media content using a mixed reality device.

Systems and methods in accordance with the embodiments described herein overcome various deficiencies in existing approaches to controlling content in an electronic environment. In particular, various embodiments provide for controlling, managing, and/or otherwise interacting with mixed (e.g., virtual/augmented) reality content in response to input from a user, including voice inputs, device inputs, among other such inputs, in a mixed reality environment. For example, a mixed reality device, such as a headset or other such device can perform various operations in response to a voice command or other such input or instruction. In one such example, the device can receive a voice command and an application executing on the device or otherwise in communication with the device can analyze audio input data of the voice command to determine how to carry out the command. The command can be used to, for example, control the view of content in the environment, as may include controlling a user's "position" in the environment. The position can include, for example, a location in time, space, etc. in the environment as well as directionality and field of view of the user in the environment. Additionally, or alternatively, the user can navigate the environment or otherwise interact with the presentation of content in the environment from a particular view at a particular time based upon a current relative position and/or orientation of the user with respect to one or more reference features and/or motion of the device, as well as changes in that relative position and/or orientation of the user and/or device. In this way, the user can navigate the environment as if the user were looking through a window, enabling the user to view the mixed reality surroundings on a display screen of the device. As the user navigates the environment, a reference element (e.g., a transport control element, a multi-dimensional reference element) can be displayed as an overlay to the environment, and can provide a visual reference to the user's position in the environment. As the user continues to navigate the environment, the display of the reference element is updated based on the user's view position and/or view orientation in the environment. In this way, the reference element can provide a preview of the user's current view position and view orientation in the environment. In various embodiments, the user can control the environment that is presented. This can include, for example, using a voice or other such command to switch between virtual and/or augmented environments. In certain embodiments, the reference element or other such element can present a display (e.g., a preview, icon, etc.) of the active environments. In response to a user command (e.g., voice command) the user can cause one or more of the environments to be presented. In such an approach, the user may cause a view of one or more of an augmented environment or a virtual environment, and may switch between such environments.

Various other functions and advantages are described and suggested below in accordance with the various embodiments.

FIG. 1A illustrates an example mixed (e.g., virtual and/or augmented) reality device 100 that can be utilized in accordance with various embodiments. Various other types of devices, such as smart glasses, goggles, and other virtual and/or augmented reality displays and devices can be used as well within the scope of the various embodiments. In this example, the device includes a housing 102 made of a material such as plastic with a polymer lip 114 or other such portion intended to contact the user's face in order to provide for comfort of the user (i.e., viewer) as well as providing a relatively light-tight seal to prevent extraneous light from passing to the user's eyes while wearing the device. The example device also includes a strap 116 or other such mechanism for securing the device to the user's head, particularly while the user's head 104 is in motion. The example device includes a left eye display screen 108 and a right eye display screen, although as mentioned in some embodiments these can be portions of a single display screen or arrays of multiple screens, or holographic displays, among other such options. In some embodiments a single display element will be used with respective convex lenses for each eye and one or more separation elements that limit the field of view of each eye to a designated portion of the display. The device will typically include display circuitry 118, as may include memory, one or more processors and/or graphics processors, display drivers, and other such components known or used for generating a display of content. There can be a single set of circuitry for both displays 106, 108 or at least some of the components can be duplicated for each display such that those components only provide for display of content on one screen or the other. The display screens can be any appropriate type of display, such as an AMOLED or LED display with sufficient refresh rate for mixed reality applications. The device includes one or more motion and/or orientation sensors 110, as may include at least one accelerometer, magnetometer, gyroscope, electronic compass, inertial sensor, and/or other such sensor for providing data about rotation, translation, and/or other movement of the device. The motion and/or orientation data can be used to determine the appropriate point of view (POV) from which to render the current scene of content. The example device also includes at least one communication component 112, such as a wired or wireless component for transmitting data over a protocol such as Bluetooth, Wi-Fi, 4G, and the like. The communication component can enable the device 100 to communicate with a computing device for purposes such as obtaining content for rendering, obtaining additional input, and the like. The example device can include other components as well, such as battery or power components, speakers or headsets, microphones, etc.

The example device 100 can also include one or more cameras 120, 122 or other image capture devices for capturing image data, including data for light reflected in the ambient or infrared spectrums, for example. One or more cameras can be included on an exterior of the device to help with motion tracking and determining environmental conditions. For example, locations of light sources, intensity of surrounding ambient light, objects or persons nearby, or any of various other objects or conditions can be determined that can be incorporated into the mixed reality scene, such as to make the lighting environmentally appropriate or to include things located around the user, among other such options. As mentioned, tracking the motion of objects represented in the captured image data can help with motion tracking as well, as rotation and translation data of surrounding objects can give an indication of the movement of the device itself.

Further, the inclusion of one or more cameras 120, 122 on the inside of the device can help to determine information such as the expression or gaze direction of the user. In this example, the device can include at least one IR emitter 124, such as an IR LED, that is capable of emitting IR radiation inside the device that can be reflected by the user. IR can be selected because it is not visible to the user, and thus will not be a distraction, and also does not pose any known health risks to the user. The IR emitter 124 can emit radiation that can be reflected by the user's face and detected by one or more IR detectors or other image capture elements 120, 122. In some embodiments the captured image data can be analyzed to determine the expression of the user, as may be determinable by variations in the relative locations of facial features of the user represented in the captured image data. In some embodiments, the location of the user's pupils can be determined, which can enable a determination of the gaze direction of the user. The gaze direction of the user can, in some embodiments, affect how objects near to, or away from, the center of the user's field of view are rendered.

Figure 1B:
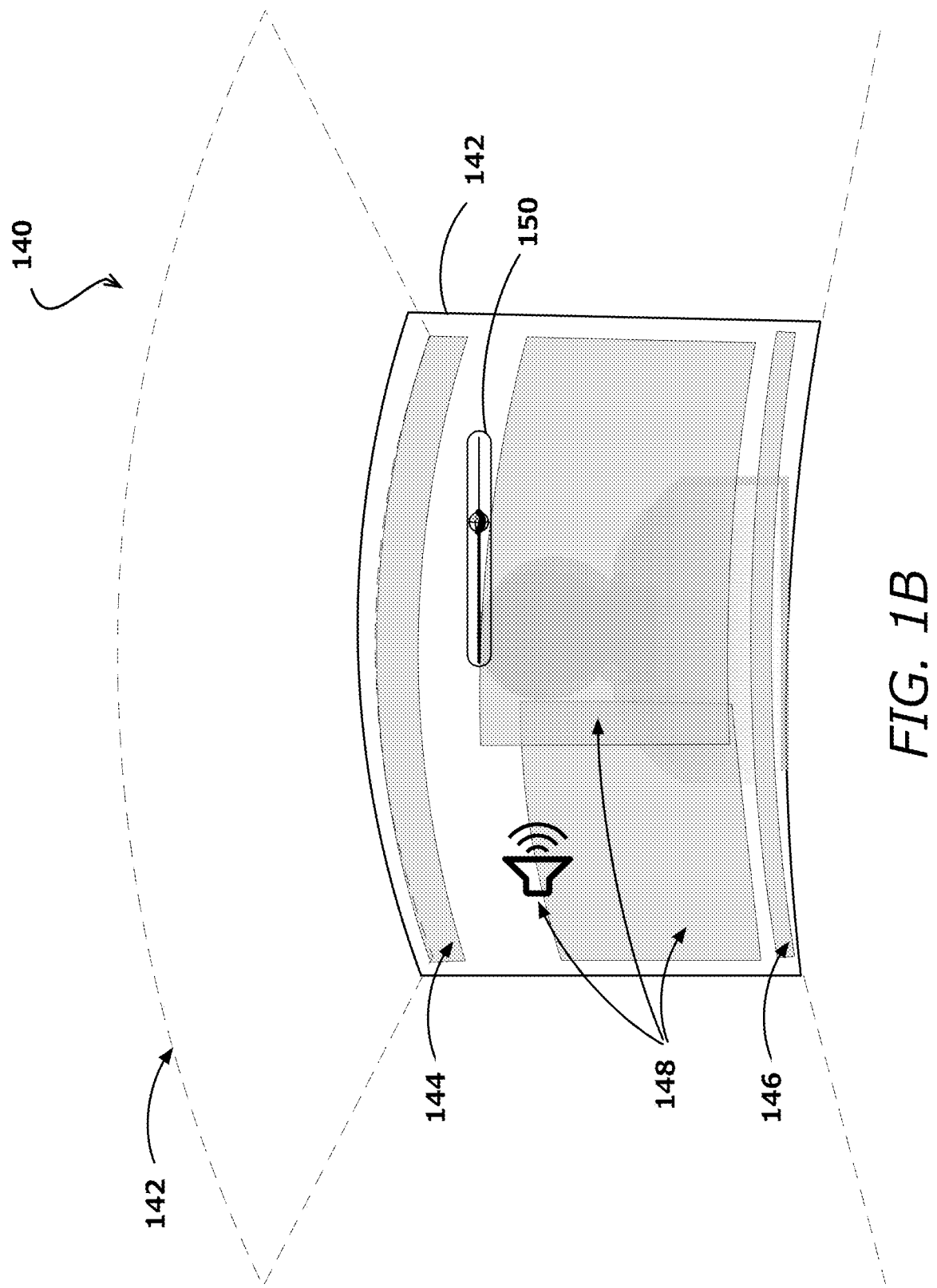

As mentioned, the device can include at least one microphone 130. The microphone can be located on the front, side, inside, or some other place on the device. Persons of ordinary skill in the art will recognize, however, that the one or more microphones may alternatively be located on a separate device in communication with the mixed reality device. The microphone can capture audio input data from spoken commands that includes a request. An application executing on the device or otherwise in communication with the device can analyze the audio input data to determine how to carry out the request. For example, FIG. 1B illustrates an example electronic environment 140 (e.g., a virtual and/or augmented reality environment) that includes content such as virtual reality, enhanced reality, three-dimensional content, augmented reality, and/or a combination thereof. The content can be displayed on a viewport of the device. The viewport can include, for example, visible area 142. Visible area 142 might be, for example, the visible area of the display element(s) of the device. In some examples, the viewport might be a portion of the visible area of the display element(s) of the device.

In this example, the viewport can display content in a configurable user interface. The user interface is configurable in that the media layers, content, and other graphical elements can be repositioned, resized, updated, among other such configurations. The content can be layered. The content can be layered in that there can be one or more media layers including content, were the media layers can be proximate to one another and/or overlapping.

In accordance with various embodiments, the viewport can display a user interface overlay that includes at least a header section 144 and a footer section 146, mixed reality content displayed in media layers 148, and a multi-dimensional reference element, transport control element, or other such reference element 150. As will be described further herein, a reference element can provide a visual reference to the user's "position" in the environment. An example user interface overlay is a heads-up display (HUD). Persons of ordinary skill in the art will recognize, however, that other user interface overlays are contemplated in accordance with the various embodiments described herein. A heads-up display can be any transparent display that presents data without requiring users to look away from their usual viewpoints. In various embodiments, the user interface overlay can be in a fixed position (while in other embodiments the user interface can be user defined and/or otherwise configurable). As shown in FIG. 1B, the user interface overlay includes a header section 144 and a footer section 146. The header and footer sections can include information useful for a user. The information can include, for example, categories of content to view, time information, view orientation information, a name associated with the environment, user profile information, application and message alerts and notifications, other information associated with the environment.

The content can be displayed in one or more media layers 148, where each media layer can display content from one of a plurality of content providers. The content can include video and/or image data, graphics, text, live streams (e.g., video, graphics, or other data streams), mixed reality conferences, mixed reality classrooms, and other virtual and/or augmented reality content. The media layers can present content in, for example, 4:3 proportions, 16:9 high definition proportions, a 360-degree panorama, in 360 degree spherical proportions, among other such display formats. The media layers can be shown or hidden and can be fixed, in a user defined position, or a combination of fixed and user defined positions. The media layers can include different media types, as may include video, audio, motion graphics, static images, information/data graphics, for example. In various embodiments, the content can be associated with a theme. Themes can include, for example, an educational theme where users can explore and interact with educational content and collaborate with other users, an exploration theme where users can explore various places both fictional and nonfictional, an interactive them where users can interact, an office theme where users can perform work-based actions, a combination of themes, among other such themes. Effects can be applied to one or more of the media layers, such as a hide/show effect, a visual opacity effect, a visual blur effect, a color saturation effect, and an audio mute (on/off) effect. When applied to a media layer, the effect can be applied to all or a portion of the media content displayed by that media layer.

In accordance with various embodiments, a number of different interfaces can be provided, where each interface can display categories. Selecting a category provides access to additional functionality and content. The categories can be associated with a particular interface, content, environment, and/or a combination thereof and/or globally accessible. In one example, categories can be used to navigate between environments and to navigate within a particular environment. This can include, for example, using the categories to show/hide content, communicate with the environment, content, and users, control a view of the environment, etc. As described, a reference element can be displayed as an overlay to the environment. A view of the reference element can be associated with the environment. For example, in one embodiment the reference element provides a view of the user's position and orientation in the environment along a time axis. In another embodiment, the reference element provides a view of the user's position and orientation in the environment along a spatial axis.

A user can invoke functionality within the mixed reality environment. This can include, for example, invoking a note taking application to dictate notes relative to a specific timestamp within the content duration of the mixed environment, communicating with users of the mixed environment, and controlling other aspects of the mixed environment using voice commands and/or gestures. In accordance with various embodiments, a user can invoke a note taking application using voice commands, air gesture-based commands, and/or using a handset or hand-held controller to invoke the note taking app. The notes can be captured through speech, where the user dictates the notes they would like transcribed, or through gesture-based input, where the notes are inputted into the note application using air gesture-based approaches. In any such situation, the notes can be contextual, where the notes are based on time and location within the duration of the content timeline and can be drawn in context, based on the time and location within the duration of the content timeline. The notes can be shared between users in the mixed environment and/or outside the mixed environment. Sharing the notes can include, for example, using speech commands, air gesture-based commands, and/or a handset or hand-held controller.

In accordance with various embodiments, users in the environment can communicate with other users in the environment, with users outside the environment, or in other such environments. Communication can include, for example, communicating with an avatar associated with a user, communicating directly a user, group communication between users, among other such types of communication. In various embodiments, peer-to-peer communication and/or group communication can be useful in educational settings, business settings, etc. For example, a specific user can use voice commands to initiate a 'presenter mode', take all users to a same location in time and perspective within the duration of the media content in the mixed environment, query or display information for the purpose of collaboration (e.g., controlling speech commands/interaction for others—moderator to audience). A presenter mode can grant a presenter (or presenters) presentation control over an audience. Presentation control can include, for example, taking users to a same location in time and perspective within the mixed environment, controlling a presentation volume, controlling presentation content, controlling aspects of a presentation venue, controlling interaction rights between members in the audience, among other such controls. It should be understood that any number of interfaces can be provided, where each interface can display categories, graphical elements, content, etc. that enable access to different types of media within the mixed environment. In certain embodiments, a user can control the environment that is presented. This can include, for example, using a voice or other such command to switch between virtual and/or augmented environments. In various embodiments, the reference element or other such element can present a display (e.g., a preview, icon, etc.) of the active environments. In response to a user command (e.g., voice command) the user can cause one or more of the environments to be presented. In such an approach, the user may cause a view of one or more of an augmented environment or a virtual environment, and may switch between such environments. It should be further noted that any one of a number of voice commands can be used to interact with the content, the mixed environment, and/or users in the mixed environment.

Figure 2:
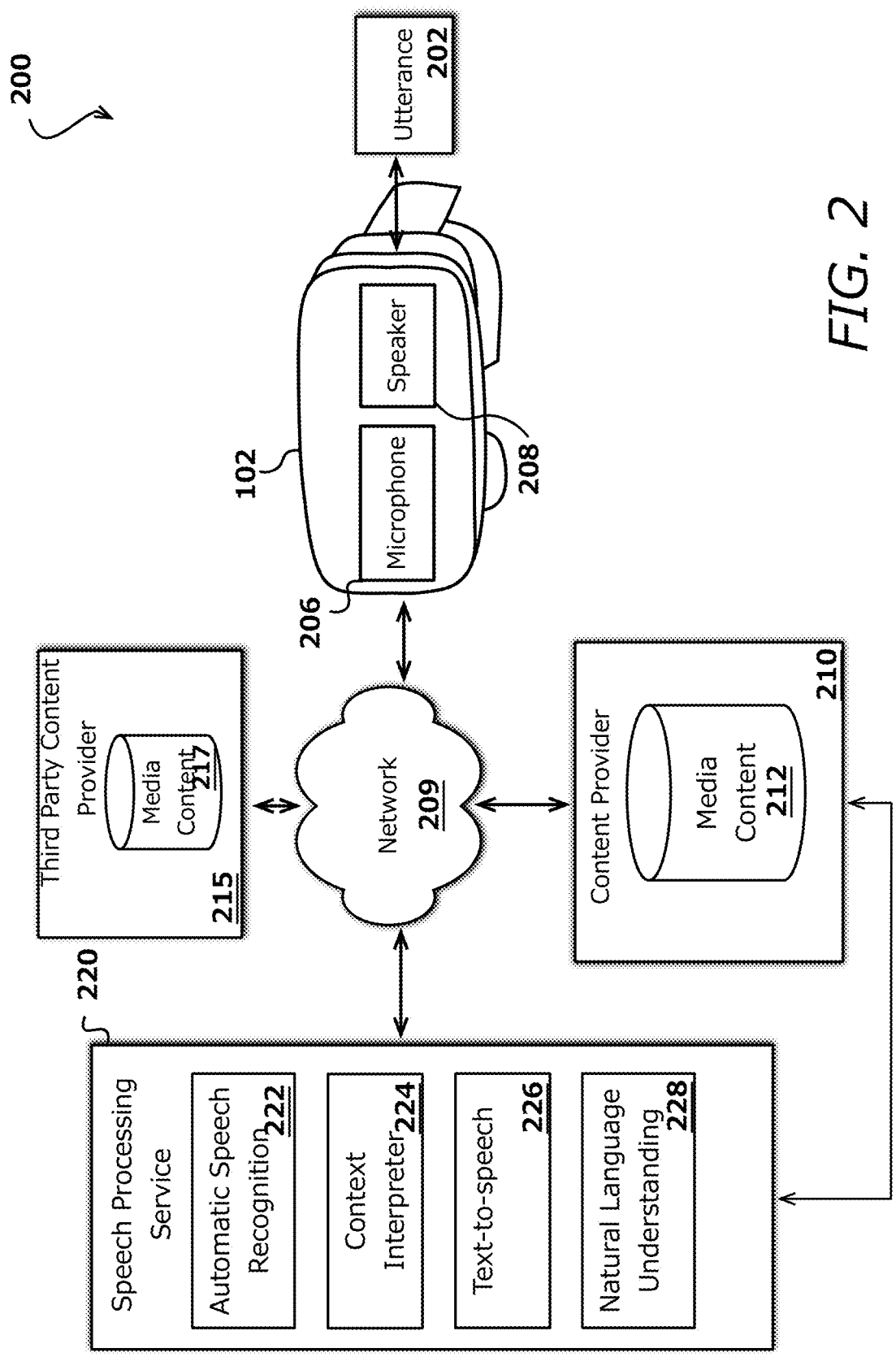
FIG. 2 illustrates an example system in accordance with various embodiments.

In accordance with various embodiments, the content and the interactions with the content and/or environment can be performed using voice commands, using input from a handset or hand-held controller, using input from a gesture performed using a feature of the user or other object, among other such input approaches. FIG. 2 illustrates an example system 200 for providing and interacting with content, such as virtual and/or augmented reality content using a mixed (e.g., virtual and/or augmented) reality device in accordance with various embodiments. In this example, system 200 shows example data flows between a speech processing service and a content provider in response to receipt of user utterances. It should be noted that additional services, providers, and/or components can be included in such a system and although some of the services, providers, components, etc. are illustrated as being separate entities and/or components, the illustrated arrangement is provided as an example arrangement and other arrangements as known to one skilled in the art are contemplated by the embodiments described herein. The system 200 can include a mixed reality device 102, a content provider 210, a third party content provider(s) 215, and a speech processing service 220.

In this example, a user may make an utterance 202, such as an utterance that includes a spoken command for the speech processing service to perform some task, such as to control the presentation of content in the environment. It should be noted, however, that controlling the presentation of content and/or the environment can be accomplished a number of ways. In this example, the user may speak the utterance into (or in the presence of) the device 102. The device 102 can correspond to a wide variety of electronic devices. In some embodiments, the device may be a computing device that includes one or more processors and a memory which may contain software applications executed by the processors. The device may include or be in communication with an audio input component for accepting speech input on which to perform speech recognition, such as a microphone 206. The device may also include or be in communication with an output component for presenting responses or other information from the speech processing service 220, such as a speaker 208. The software of the device may include hardware components and/or software for establishing communications over wireless communication networks or directly with other computing devices.

The content provider 210 can correspond to an online service that provides access to content. The content provider can comprise one or more media libraries or databases 212. It is important to note that although shown as being included with the content provider 210, in some embodiments, the one or more media libraries 212 can be separate from the content provider 210. In other words, in some cases, the one or more media libraries 212 can reside on one or more servers external to one or more servers on which the media service 210 resides. For example, the media libraries can be stored in media content data store 217 provided by a third party content provider 215. The one or more media libraries 212, 217 can store, in part, data representative of content. The data representative of the content can be accessible (e.g., downloading, streaming, etc.) to the device 102. The device 102 can acquire (e.g., download, stream, etc.) the data from the content provider 210 and/or the third party content provider 215 and, as a result, play the content. In accordance with various embodiments, a user can subscribe to content channels, where each channel can correspond to content from one or more content providers. Example content includes, for example, 360° video, graphics, text, interactive video content, etc. A user can subscribe to a mixed classroom channel. Within the mixed reality classroom environment, the user can subscribe to other channels corresponding to classes offered through the mixed reality classroom channel. Each mixed classroom can be associated with an interface, and that interface can display categories to enable access to media elements that enable some level of interaction within the mixed reality classroom. In this example, categories can correspond to a note taking application, a class schedule application, or any number of different types of applications. In another example, a user interface for exploring geographic regions can be provided, where the user interface can include categories specific to exploration. Example categories include a map application allowing access to different types of maps, views of those maps, access to information, among other such categories.

The speech processing service 220 can receive a user utterance 202 via communication network 209. The speech processing service 220 can be a network-accessible service in communication with the device 102 via the communication network, such as a cellular telephone network or the Internet. A user may use the device 102 to submit utterances, receive information, and initiate various processes, either on the device or at the speech processing service 220. For example, as described, the user can issue spoken commands to the device 102 in order to control, interact, or otherwise manage the playback of the content.

The speech processing service 220 may include an automatic speech recognition (ASR) module 222 that performs automatic speech recognition on audio data regarding user utterances, a natural language understanding (NLU) module 228 that performs natural language understanding on transcriptions generated by the ASR module 222, a context interpreter 224 that applies contextual rules to current NLU results based on prior interpretations and dialog acts, a natural language generation ("NLG") module that converts certain dialog acts into user-understandable communications (e.g., text that can be "read" to the user by a text-to-speech 226 or "TTS" component), among other such modules.

The speech processing service 220 may include any number of server computing devices, desktop computing devices, mainframe computers, and the like. Each individual device may implement one of the modules or components of the speech processing service 220. In some embodiments, the speech processing service 220 can include several devices physically or logically grouped together to implement one of the modules or components of the speech processing service 220. For example, the speech processing service 220 can include various modules and components combined on a single device, multiple instances of a single module or component, etc. In one specific, non-limiting embodiment, the speech processing service 220 may include a server or group of servers configured with ASR and/or NLU modules 222, 228, a server or group of servers configured with a context interpreter 224 and/or a text-to-speech 226, etc. In multi-device implementations, the various devices of the speech processing service 220 may communicate via an internal communication network, such as a corporate or university network configured as a local area network ("LAN") or a wide area network ("WAN"). In some cases, the devices of the speech processing service 220 may communicate over an external network, such as the Internet, or a combination of internal and external networks.

In some embodiments, the features and services provided by the speech processing service 220 may be implemented as web services consumable via a communication network. In further embodiments, the speech processing service 220 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the features of the speech processing service 220 may be integrated into the device such that network connection and one or more separate computing systems are not necessary to perform the processes of the present disclosure. For example, a single device may include the microphone 206, the ASR module 222, the NLU module 228, the context interpreter 224, the text-to-speech 226 module, or some combination thereof.

As described, users may submit utterances that may include various commands, requests, and the like. The microphone 206 may capture utterance audio and provide it (or data derived therefrom) to the speech processing service 220. The ASR module 222 may generate ASR results for the utterance, such as a w-best list of transcriptions. Each transcription or portion thereof may be associated with some score, such as a confidence score or a likelihood that the transcription or portion thereof is correct. The w-best list or some other type of results may be provided to the NLU module 228 so that the user's intent may be determined. A w-best list of interpretations (e.g., intents) may be determined or generated by the NLU module 228 and provided to the context interpreter 224. The context interpreter 224 can process the NLU results (e.g., modify individual interpretations, filter interpretations, re-score or re-rank interpretations, etc.). In accordance with various embodiments, the result can be provided to the content provider to initiate playback of the content using the device. In certain embodiments, the result can include the text-to-speech 226 component can translate a semantic response into human-readable text, synthesized speech, etc. and the translated response can be provided to the device and played using the device.

Figure 3A:
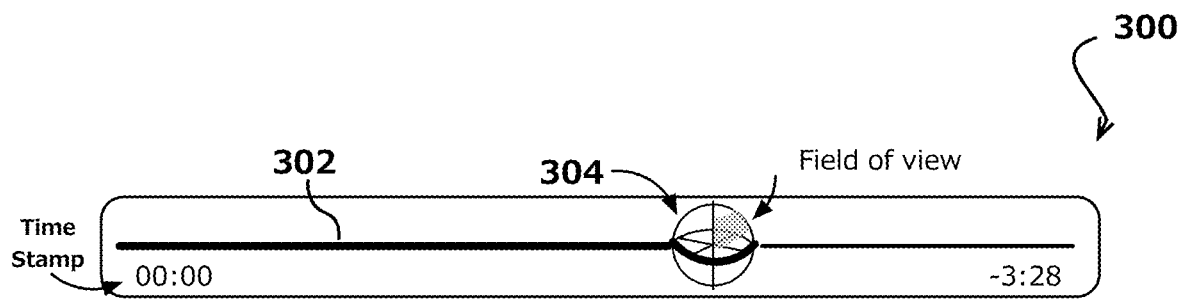
FIGS. 3A, 3B, and 3C illustrate an example multi-dimensional reference element in accordance with various embodiments.

As described, a reference element can be displayed as an overlay to the environment and/or content, and can provide a visual reference to the user's position within the mixed environment. The reference element can be a multi-dimensional reference element. In accordance with various embodiments, the dimensions can include a location dimension, a time dimension, a spatial dimension, or a combination thereof. FIG. 3A illustrates example 300 of a multi-dimensional reference element displayed with respect to a time dimension. In this example, the multi-dimensional reference element includes a progress bar 302 that displays a user's overall progress through the content, the user's current play position, and the contents total running time. In accordance with various embodiments, a request can be received to change the content being displayed. For example, a user can make a request to "go to three minutes, forty-two seconds." Content corresponding to the request can be displayed and a tracking element 304 or other graphical element can be positioned at a current play position on the progress bar. As shown in FIG. 3A, the tracking element provides a visual representation of a position along the progress bar as well as a visual representation of the general direction the user is viewing in the mixed environment. For example, in the situations where a user makes a request to view content "one hundred thirty-five degrees right and forty-five degrees up," content corresponding to the request can be displayed and the tracking element can visually represent the position along the timeline as well the field of view of the user in the environment.

In accordance with various embodiments, the field of view can be represented by x, y, z, spherical coordinates with respect to the environment. The field of view can be updated by the user using a voice command, a gesture input, input from a handset or hand-held controller, or motion input from a change in orientation of the device. In a situation where the user requests a change in the field of view, the user's request can be analyzed to determine appropriate information from the request, and a number of mapping and spatial determination algorithms can be utilized to determine the appropriate spherical coordinates for the user's point of view in the environment. It should be noted that any suitable mapping algorithm may be employed in accordance with various embodiments.

Figure 3B:
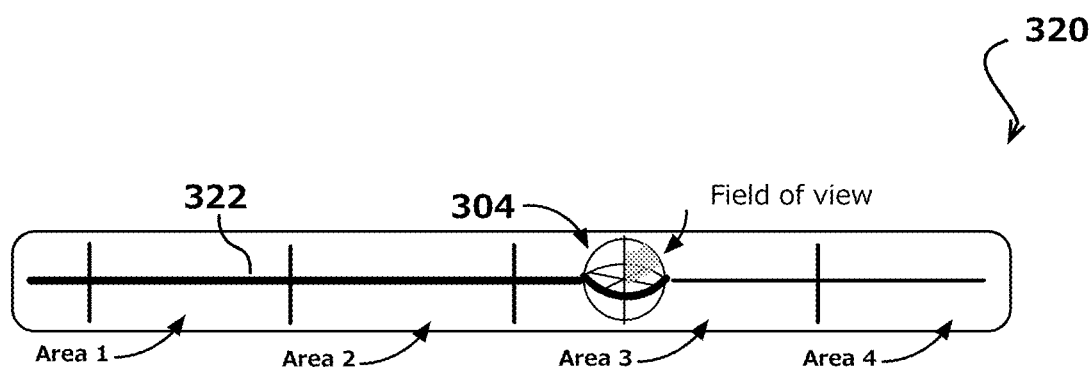

FIG. 3B illustrates example 320 of a multi-dimensional reference element displayed with respect to a spatial dimension. In this example, the progress bar 322 corresponds to a number of different mixed reality areas in the environment. An area can include, for example, mixed reality geographic areas both fictional and nonfictional such as mixed reality land forms, mixed reality bodies of water, mixed reality solar systems, or any other mixed reality location having a relationship of a place to other places. In this example, in response to a request to move from one mixed reality area in the environment to another mixed reality area in the environment, content corresponding to the request can be displayed and the tracking element can have positioned at the appropriate play position on the progress bar. For example, in response to "go to area three," content corresponding to area three can be displayed and the tracking element can be positioned at area three along the progress bar. Additionally, the request can include a view orientation. In response to such a request, content corresponding to the area requested at the specified view orientation can be displayed.

Figure 3C:
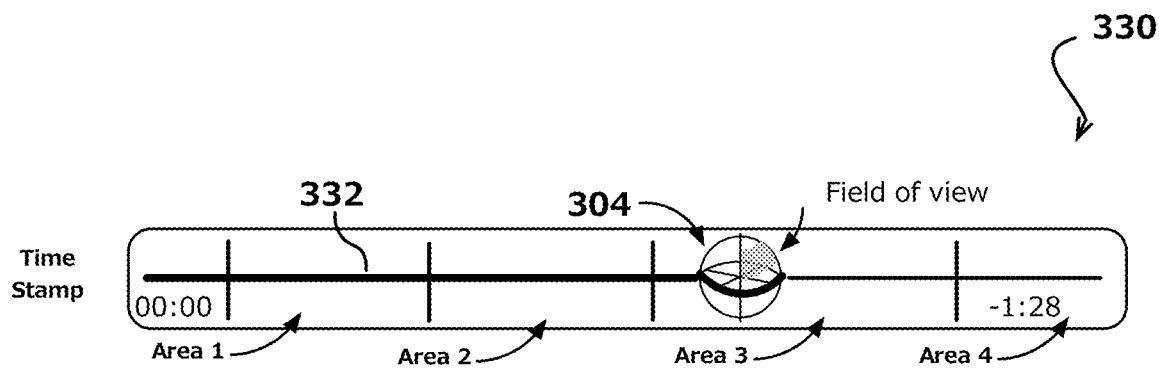

FIG. 3C illustrates example 330 of a multi-dimensional reference element displayed with respect to both a time dimension and a spatial dimension in accordance with various embodiments. One example mixed environment that might include a time dimension in a spatial dimension can be a mixed reality education-based environment, where mixed reality classrooms in the environment can correspond to areas along the progress bar and the play position within an area can correspond to a time during, for example, a mixed reality lecture. Other mixed reality events include, for example, mixed reality seminars, mixed reality presentations, mixed reality conferences, and other such mixed reality events. In this example, the progress bar 332 displays a number of different areas in the environment, as well as a user's play position for a particular area. In response to a request to move from one mixed reality area in the environment to another mixed reality area in the environment for a particular play position, content corresponding to the requested area and play position can be displayed and the tracking element can be positioned at the appropriate play position on the progress bar. For example, in response to a request to "go to one minute, twenty-eight seconds of area three," media content corresponding to the request can be displayed and the tracking element can be positioned accordingly.

In many embodiments, other graphical elements can be displayed. The graphical elements can be displayed proximate to the tracking element, or in another viewable area in the mixed reality environment. An example graphical element can be a volume control element, a media control element (e.g., a playhead), a microphone control element, a media recording control element, among other such graphical elements. In the example of a media control element, the media control element can visually indicate the active media control mode. For example, a pause/play graphical element that indicates whether the media content is playing or paused can be displayed, a progress bar that displays the overall progress through media content and its total running time can be displayed, a volume indicator that displays current sound level of the media content can be displayed, among other such information. Media control modes can include, for example, a play mode, a pause mode, a fast-forward mode, a rewind mode, a repeat mode, a loop mode, among other such modes. In accordance with various embodiments, the user can control the state of the environment using spoken commands or other such inputs, and the graphical presentation of the control element can indicate the state of the environment (e.g., whether the environment is paused, playing, etc.)

Figure 4A:
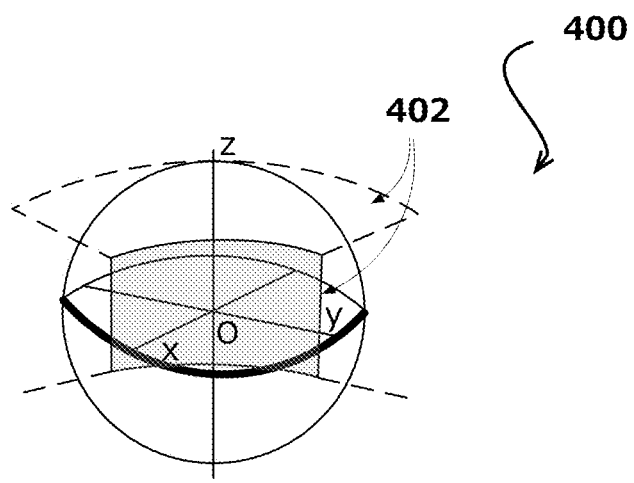
FIGS. 4A, 4B, 4C, 4D, 4E, and 4F illustrate example graphical representations that can be utilized to provide view direction and view orientation information in a mixed reality environment in accordance with various embodiments.

FIG. 4A illustrates example 400 of a tracking element or other such graphical element that can be used to provide a visual representation of a position along the progress bar as well as a visual representation of the point of view and direction a user is viewing in a mixed (e.g., virtual and/or augmented) reality environment. The tracking element can include a viewspacer 402. The viewspacer can be a graphical element that provides a representation of a field of view of a user within the environment. As described, the field of view can include a view direction and/or a view orientation of a user within the environment. As the user's field of view changes, a display of the viewspacer can change to match the field of view of the user. For example, the user can request to change their field of view in the environment. As described, this can include a voice command to view mixed reality content "to the left." In response to the voice command, the user's field of view within the environment will shift to the left to display content to their left and the display of the viewspacer will update based on the user's current view direction and/or view orientation. Accordingly, the field of view of the user in the environment is graphically represented by the viewspacer. As the user's field of view changes, the display of the viewspacer is updated accordingly. In this way, the viewspacer can provide a preview of the user's current field of view in the environment.

In various embodiments, a mixed reality device typically includes some type of motion and/or orientation detection sensor, such as an accelerometer, gyroscope, electronic compass, inertial sensor, magnetometer, and the like, which can provide data as to movement of the device resulting from movement of the user's head, in general. The viewspacer can be updated based on movement of the device such that as the user's field of view changes, the display of the viewspacer can be updated accordingly.

As shown in FIG. 4A, the viewspacer 402 is displayed with respect to a three dimensional Cartesian coordinate system, with origin O and axis lines X, Y and Z, oriented as shown. It should be noted that although a Cartesian coordinate system shown, one of a number of other coordinate systems can be used. Further, it should be noted that because there are many different possible coordinate systems for describing geometrical figures, fields of view, etc., one or more coordinate transformations can be used to give formulas for the coordinates in one system in terms of the coordinates in another system. For example, coordinate systems can be used to describe positions in an object space, in a mixed reality environment space, a user's viewing space, and on a viewport surface. In accordance with various embodiments, the object coordinate space can be a three-dimensional coordinate system in which a graphics object can be described. The mixed reality coordinate system can be a three-dimensional coordinate system in which graphics objects are represented in relation to one another. The xyz origin can be located at 0 altitude, with the x and y axes aligned with the major compass directions. The positive x direction can be east, the positive y direction can be north, and the positive z direction can be up. The user's viewing coordinate system can be a three-dimensional coordinate system with respect to the user. In accordance with an embodiment, the user's eyes can be at the xyz origin. The positive x direction can be into the screen (and away from the user), the positive y direction can be the angle of left to right (with a positive angle number defining clockwise or up and a negative number defining counterclockwise or down), and the positive z direction can be the angle from the "ground" to the "sky." The viewport coordinate space can be a two-dimensional coordinate system relative to the viewport. As described, the viewport is the viewing surface on the display screen of the mixed reality device.

In certain embodiments, a user may desire to reset the point of origin. In such a situation, the user can speak a command, e.g., "reset origin," select a reset button on a hand-held controller, among other such options. It should be noted that although example coordinate systems are provided, those skilled in the art will understand that one of a number of coordinate systems can be used as well within the scope of the various embodiments. Accordingly, it should be noted that requests to "look up," "look down," and other such requests can be analyzed to determine corresponding coordinates operable in the context of the environment. Such analysis can include utilizing any number of transformation algorithms or other algorithms to determine three-dimensional (3D) space coordinates in the environment with respect to the user's point of view.

Figures 4B, 4C:
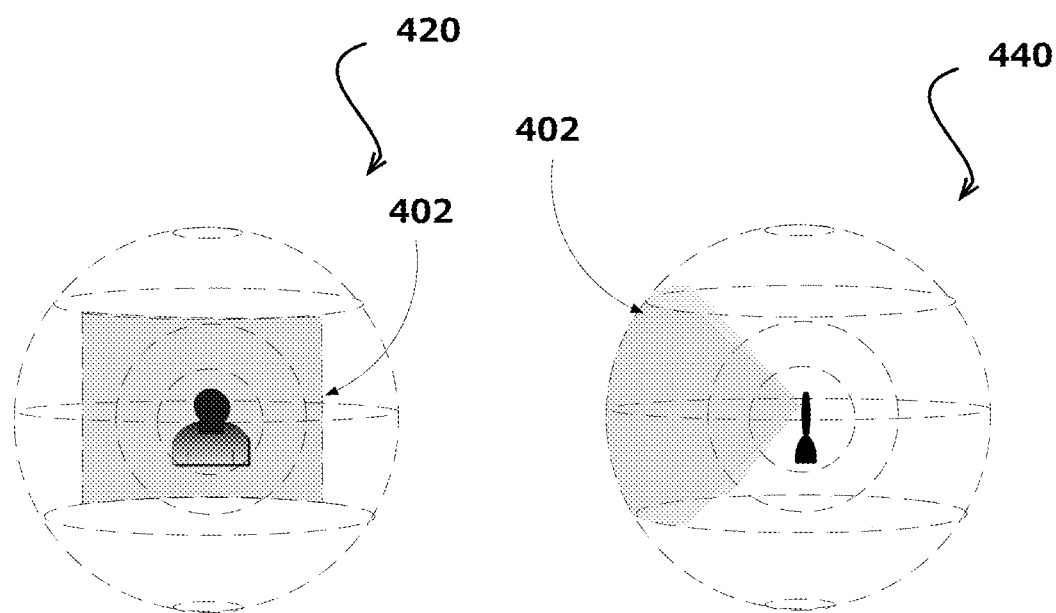

In accordance with various embodiments, a user can request a change in a view direction and/or view orientation using natural language, which can be converted to coordinates with respect to the environment. Example natural language requests included "look left ninety degrees," "look up forty-five degrees," "look down" (which may look down ninety degrees) "look left and up" which may use predetermined increments of fifteen degrees, for example, for each request. In accordance with various embodiments, the user can use natural language to describe the change in view direction and/or view orientation within the mixed reality environment to change the content viewed. As such, the request does not have to include specific coordinates or angle (e.g., look minus 90 degrees); rather, the request can be analyzed to determine the intent of the user's request with respect to the current field of view of the user. Example 420 of FIG. 4B illustrates an example view of the default view of the viewspacer. The default view corresponds to straight forward. The default view can be used, for example, when the device is powered on, when the user resets the point of origin, or under other such circumstances. It should be noted that FIG. 4B is merely an example default view and other default views are contemplated in accordance with various embodiments. Example 440 of FIG. 4C illustrates an example view of the viewspacer looking left in response to a request to "look left ninety degrees." In this example, in response to the request, content corresponding to the user's left in the environment is displayed. As the user's field of view changes, a display of the viewspacer can currently change to match the field of view of the user.

Figure 4D:
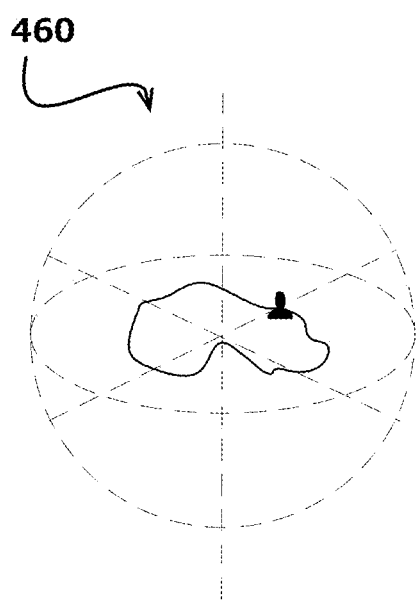

In accordance with various embodiments, a user can change the depth vector of view orientation within the mixed reality environment using natural language. Example 460 of FIG. 4D illustrates an example view of a graphical representation portraying the user's position within the mixed reality environment after the user has moved along a virtual depth vector in response to a request to "zoom in 100 feet." In this example, in response to the request, content corresponding to the user's view moving forward along the depth vector 100 feet within the mixed reality environment is displayed. In response to the user request to "zoom in 100 feet," the graphical representation 460 reflects that the user has effectively moved from the center of the mixed reality environment. Example 460 demonstrates that graphical representations of the user's position may effectively merge three-dimensional and two-dimensional coordinate systems. Embodiments may also allow the user to request, for example, to "zoom out 100 feet." In this scenario, the view would move backward along the depth vector, returning the user's view to that reflected by the viewspacer in FIG. 4C.

Figure 4E:
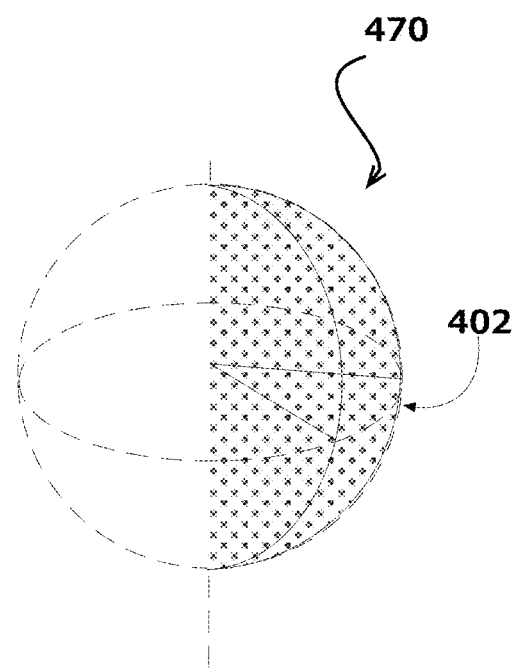

FIG. 4E illustrates example graphical representation 470, which represents another view of the user's field of view within the mixed reality environment. View spacer 402 provides a view of the spherical wedge corresponding to the user's field of view, including when the user looks up and looks down.

Figure 4F:
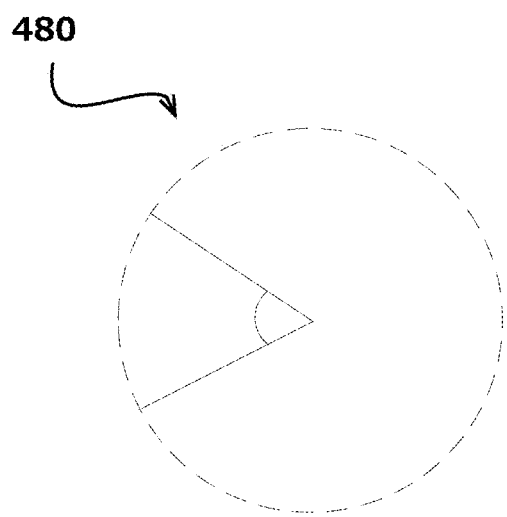

FIG. 4F provides two-dimensional representation 480, which presents the spherical wedge corresponding to the user's field of view from above the mixed reality environment. In response to natural language commands from the user, the spherical wedge represented in 4E and 4F may change to reflect the user's updated view. For example, in response to a user request to "turn right 45 degrees," the spherical wedge in both 4E and 4F would adjust to reflect the user's updated view. Additionally, the mixed reality environment may be divided into units, such that a user may request to move to another area in the environment in terms of such units. For example, a user could issue the voice command to "go to Sector 7" and the positional graphical representations 4D, 4E, and 4F would adjust to correspond to the newly-requested position.

Figure 5:
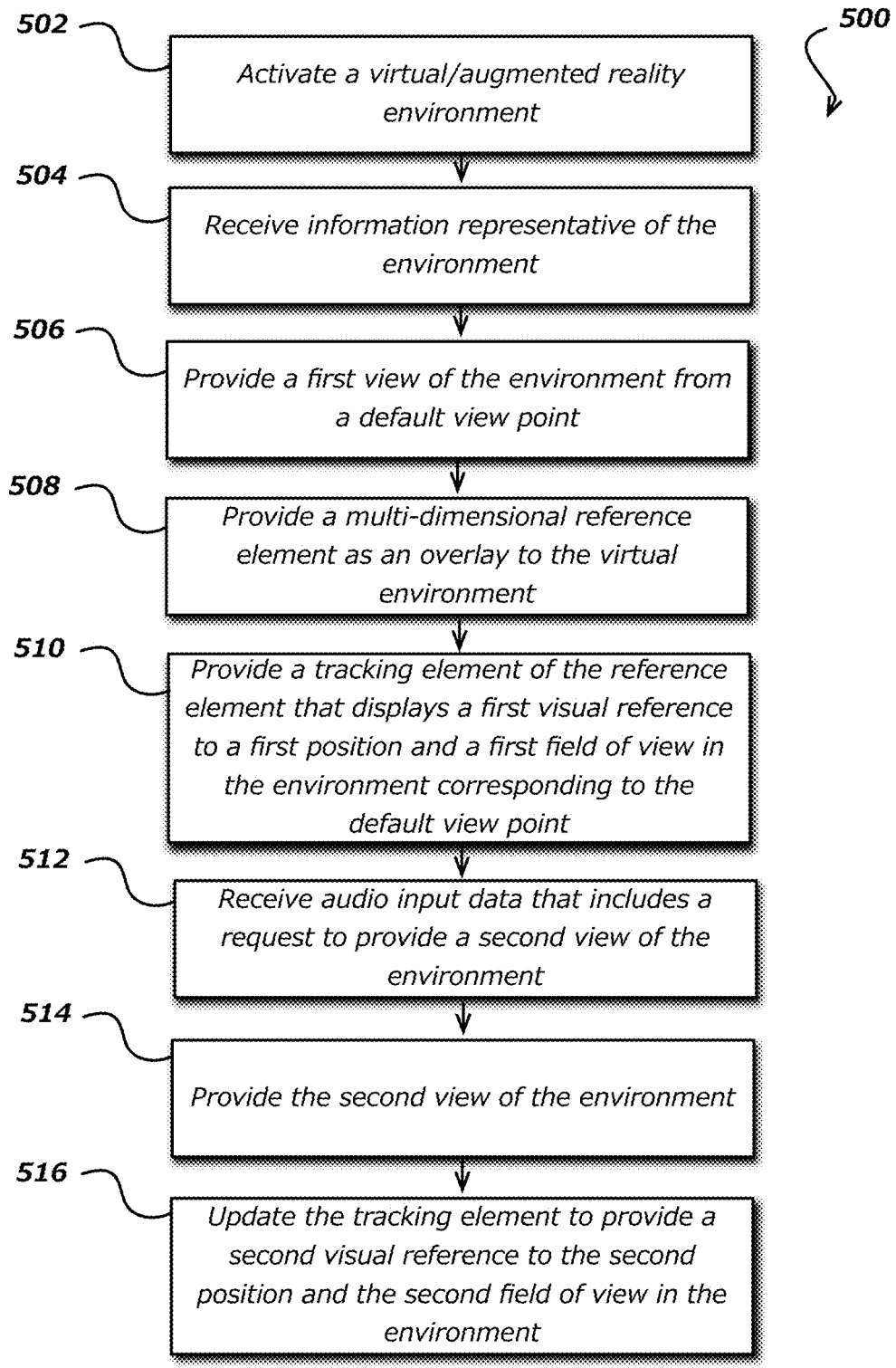
FIG. 5 illustrates an example process using speech to update a reference element to provide view direction and view orientation information in a mixed reality environment in accordance with various embodiments.

FIG. 5 illustrates an example process 500 using speech to update a reference element to provide view direction and view orientation information in a mixed reality environment in accordance with various embodiments. It should be understood that there can be fewer, additional, or alternative steps performed in similar or alternative orders, or in parallel, within the scope of the various embodiments unless otherwise stated. In this example, a mixed (e.g., virtual and/or augmented) environment is activated 502 on a mixed reality device. In some embodiments a user may activate this mode manually, while in other modes the device can activate the mode automatically when the device worn on the user's head. In response to activating the mixed reality environment mode, information representative of the environment can be received 504 at the device. The user can be provided 506 a first view of the environment from an initial reference or default view point. A multi-dimensional reference element can be provided 508 as an overlay to the environment. A tracking element of the multi-dimensional reference element that displays a first visual reference to a first position and a first field of view (orientation) in the environment can be provided 510. For example, the multi-dimensional reference element can include a progress bar that includes a tracking element to display a user's overall progress through the content, a user's current play position as it relates to time, mixed reality areas in the environment, or a combination thereof, and the contents total running time or total running time for a particular mixed reality area.

In accordance with various embodiments, the user can navigate the environment from a particular view at a particular time as if the user were looking through a window, enabling the user to see an augmented reality of the environment. In this example, audio input data is received 512 by a microphone of the device. The audio input data corresponds to an utterance that includes instructions to provide a second view for a second position and a second field of view within the environment. For example, the utterance can be to "go to three minutes, forty-two seconds and look up." A second view of the environment based on the request can be provided 514. The tracking element can be updated 516 to provide a second visual reference to the second position and the second field of view in the environment. This can include, for example, displaying the tracking element at the second position on the progress bar and providing a visual reference to the second field of view on the tracking element.

Figure 6:
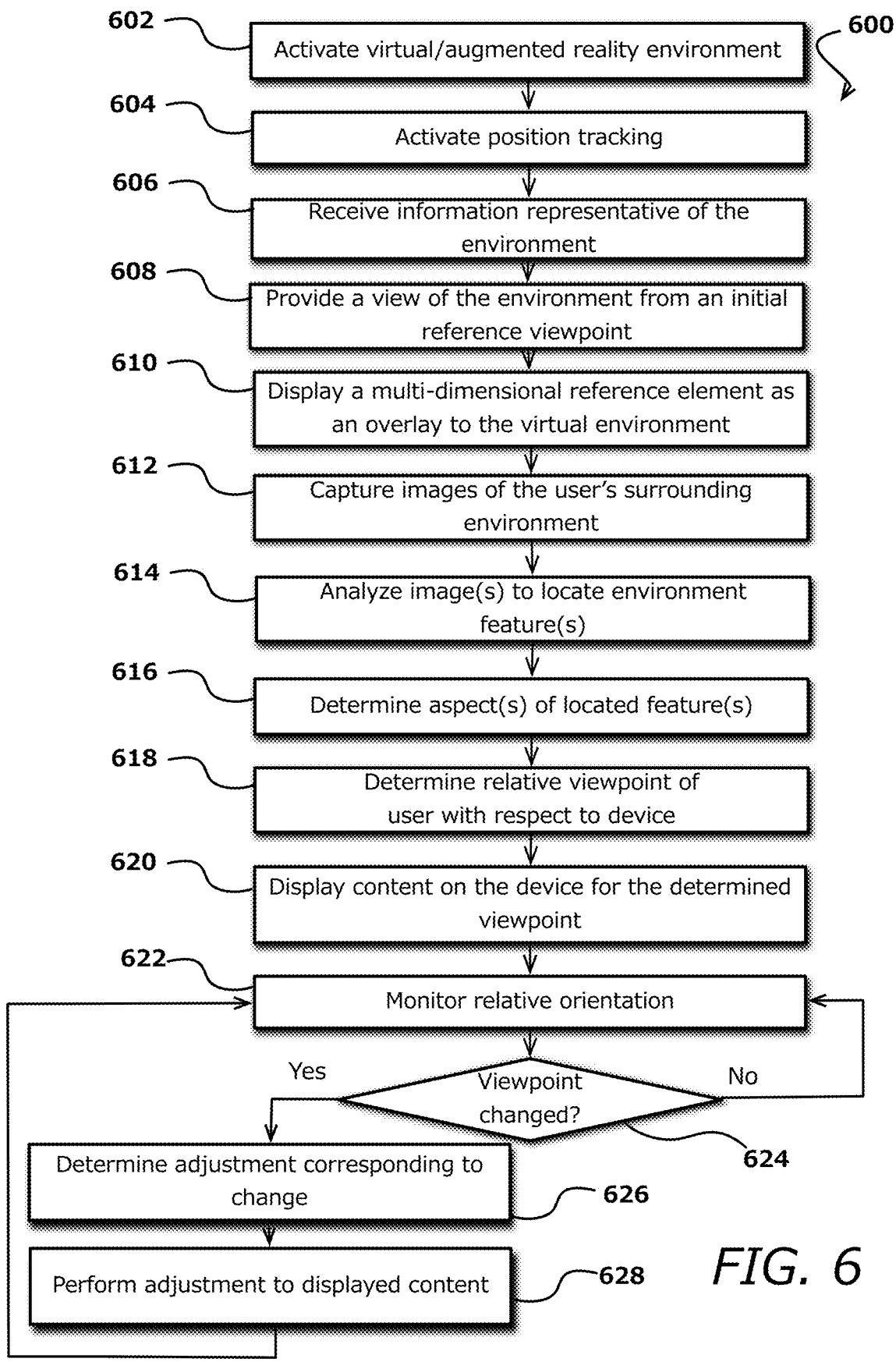
FIG. 6 illustrates an example process for using device motion to update a reference element in a mixed reality environment in accordance with various embodiments.

FIG. 6 illustrates an example process 600 for using device motion to update a reference element in a mixed (e.g., virtual and/or augmented) reality environment in accordance with various embodiments. As described, the information representative of the environment can be provided access by a user, or a device of a user. In the situation of providing the user access, the user can navigate the environment from a particular view at a particular time as if the user were looking through a window, enabling the user to see an augmented reality of the environment. In this way, the user can be provided with a view of the environment that is based, at least in part, upon a current relative position and/or orientation of the user with respect to the one or more reference points, as well as changes in that relative position and/or orientation of the device. As the user tilts, rotates, or otherwise changes the orientation of the device, the device can act like a window whereby the user can see around the environment. The relative movements can be based upon factors such as a direction of change in orientation of the device, or other such factors. The relative movements can be selected such that the view is appropriate with changes in relative position and/or orientation of the device, and thus viewing angle, of the user.

For example, as described above with respect to FIG. 5, a mixed reality environment is activated 602 on a mixed reality device. In response to activating the mixed reality environment mode, position tracking of a user is activated 604 on the device. Information representative of the environment can be received 606 at the device. The user can be provided 608 a view of the environment from an initial reference or default view point. A multi-dimensional reference element can be displayed 610 as an overlay to the mixed reality environment. As described, the user can navigate the mixed reality representation of the environment from a particular view at a particular time as if the user were looking through a window, enabling the user to see an augmented reality of the environment.

In this example, a camera of the device can capture 612 still images or video of the user's surrounding environment. In some embodiments, the imaging will involve ambient light image or video capture, while in other embodiments a device can utilize infrared imaging, heat signature detection, or any other such approach. The device can analyze 614 the captured images to attempt to locate features of the environment, where those features in some embodiments include at least wall fixtures, furniture, objects, etc. In some embodiments, object recognition or any other such algorithm can be used to attempt to determine the presence of an object, or other portion or feature of the user's environment, in the field of view of at least one of the imaging elements.

Once the user features are located, the device can attempt to determine 616 aspects or information relating to those features such as the approximate location and size of the features. In this example, the determined aspects can be used to attempt to determine 618 a relative orientation between those features and the device, which can be useful in determining information such as a viewing location of a user. For example, software executing on the device (or otherwise in communication with the computing device) can obtain information such as the angular field of view of the camera, the zoom level at which the information is currently being captured, and any other such relevant information, which can enable the software to determine an approximate direction of the device with respect to those features. In many embodiments, direction information will be sufficient to provide adequate point-of-view dependent rendering.

Mixed reality image content (e.g., images, text, planes of content, etc.) can be displayed 620 based on the determined viewing direction of the user. The user can be provided a view of the environment that is based at least in part upon a current relative position and/or orientation of the device with respect to those features, as well as changes in that relative position and/or orientation. In this way, the device displays images in a way as if the user were looking through a window, enabling the user to see an augmented reality of the environment. The relative movements can be based upon factors such as the distance of the features to the device, a direction of movement of the user, a direction of change in orientation of the device, or other such factors. The relative movements can be selected such that the view appropriately changes with changes in relative position and/or orientation, and thus viewing angle, of the user.

The determined aspects of the user then can be monitored 622 over time, such as by continuing to capture and analyze image information to determine the relative position of the device. In at least some embodiments, an orientation-determining element such as an accelerometer or electronic gyroscope can be used to assist in tracking the relative location of the device and/or current relative orientation of the device. A change in the aspect, such as a change in position or orientation, can be determined 624, and the device can determine 626 whether that change requires an adjustment to the content to be displayed. For example, an application might require the device to be rotated a minimum amount before adjusting the displayed content, such as to account for a normal amount of user jitter or other such movement that may not be intended as input. Similarly, certain embodiments might not utilize continuous rotation, but might change views upon certain degrees of change in relative orientation of the device. If the orientation change is sufficient to warrant an adjustment, the device can determine and perform 628 the appropriate adjustment to the content, such as to provide the user a different view of the environment. As the view of the environment changes, a view of the multi-dimensional reference element can be updated to match the field of view of the user. For example, in response to the user's field of view within the environment shifting down to display content to below the user, the view of the multi-dimensional will update based on the user's current view direction and/or view orientation. As such, as the user's field of view changes, due to movement of the device, voice instructions, etc., the display of the reference element is updated accordingly.

Figure 7:
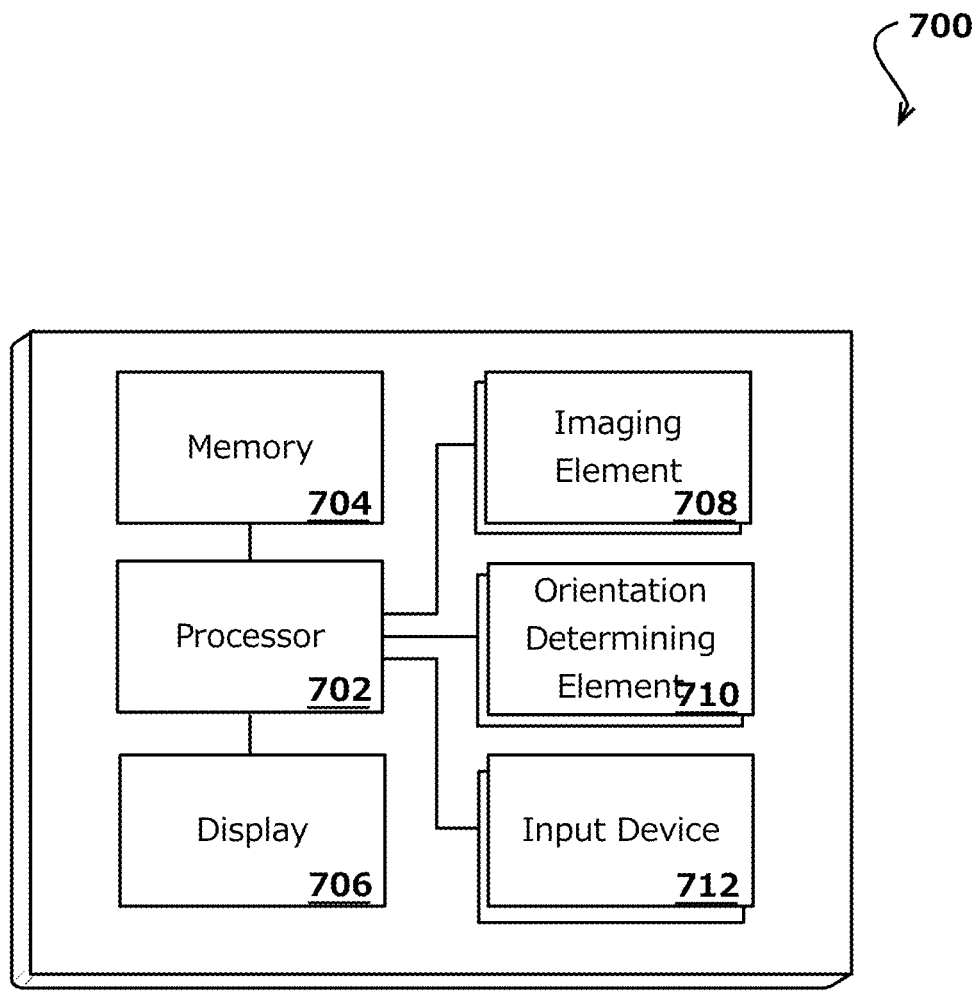
FIG. 7 illustrates components of an example computing device that can be utilized to implement aspects of the various embodiments.

FIG. 7 illustrates a set of basic components of an example computing device 700 that can be utilized in accordance with various embodiments. The computing device can be any appropriate device able to receive and process input commands, such as a mixed reality device, a personal computer, laptop computer, television set top box, cellular phone, PDA, electronic book reading device, video game system, or portable media player, among others. In this example, the device includes a processor 702 for executing instructions that can be stored in a memory device or element 704. As known in the art, the device can include many types of memory, data storage or computer-readable media, such as a first data storage for program instructions for execution by the processor 702, a separate storage for images or data, a removable memory for sharing information with other devices, etc. The device typically will include some type of display element 706, such as a liquid crystal display (LCD), although devices such as portable media players might convey information via other means, such as through audio speakers. As discussed, the device in many embodiments will include at least one imaging element 708 such as a camera, sensor, or detector that is able to image a facial region of a user. The imaging element can include any appropriate technology, such as a CCD imaging element having a sufficient resolution, focal range and viewable area to capture an image of the user when the user is operating the device. Methods for capturing images using an imaging element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application or other device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element 710 that is able to determine a current orientation of the device 700. In one example, at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

In some embodiments, the device can include at least one additional input device 712 able to receive conventional input from a user. This conventional input can include, for example, a push button, touch pad, touch-sensitive element used with a display, wheel, joystick, keyboard, mouse, keypad or any other such device or element whereby a user can input a command to the device. Some devices also can include a microphone or other audio capture element that accepts voice or other audio commands. For example, a device might not include any buttons at all, but might be controlled only through a combination of visual and audio commands, such that a user can control the device without having to be in contact with the device. As will be discussed later herein, functionality of these additional input devices can also be adjusted or controlled based at least in part upon the determined gaze direction of a user or other such information.

Figure 8:
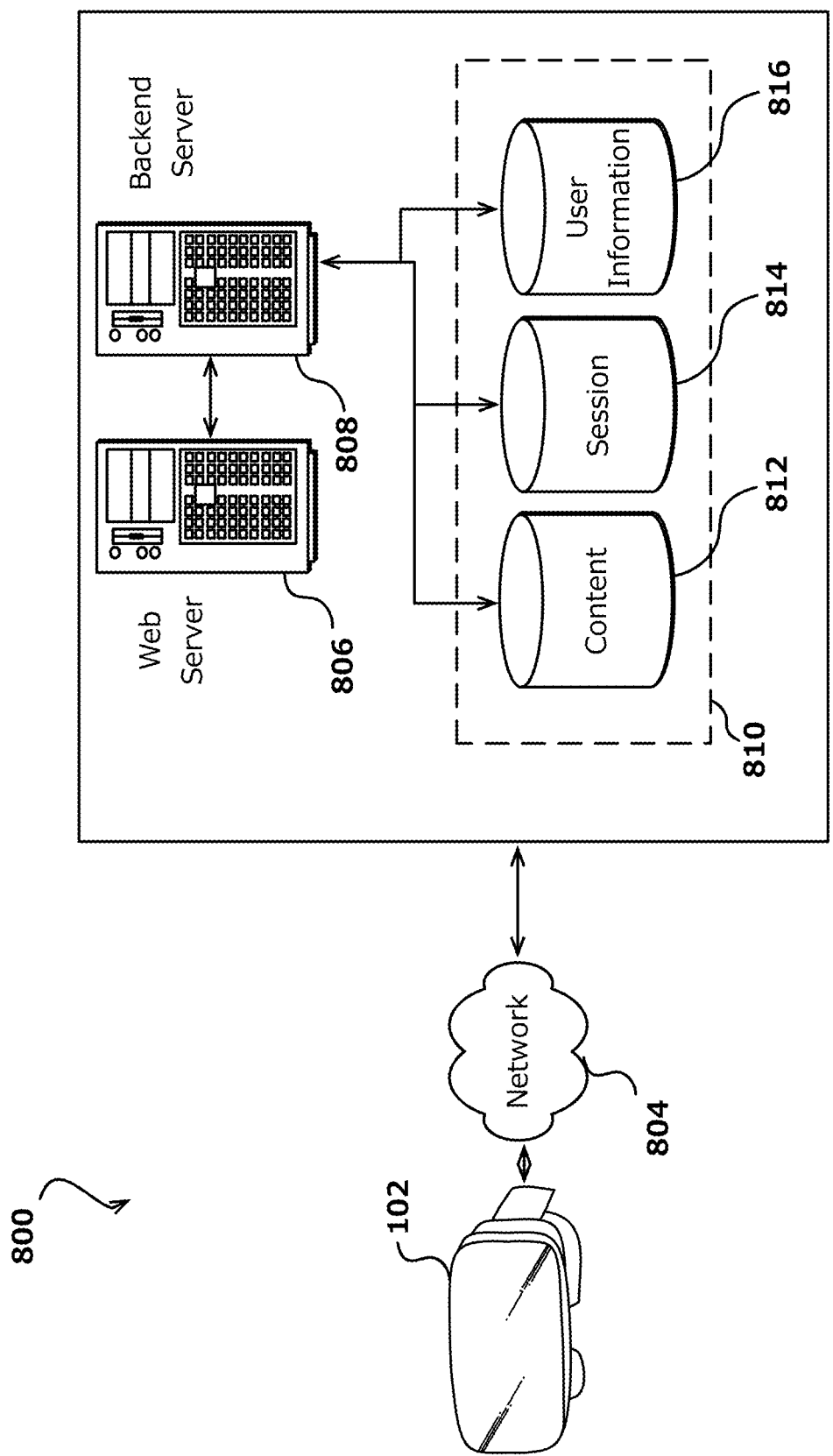
FIG. 8 illustrates an example environment in which various embodiments can be implemented.

In accordance with various embodiments, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes mixed reality device 102, which can include any appropriate device operable to send and receive requests, messages or information over network 804 and convey information back to an appropriate device. The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one backend server 808 and a data store 810. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 808 can include any appropriate hardware and software for integrating with the data store 810 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 806 in the form of HTML, XML or another appropriate structured language in this example. The handling of all requests and responses, as well as the delivery of content between the mixed reality device 104 and the backend server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be other information that may need to be stored in the data store, such as page image information and access rights information, which can be stored in any of the above listed mechanisms as appropriate or in additional mechanisms in the data store 810. The data store 810 is operable, through logic associated therewith, to receive instructions from the backend server 808 and obtain, update or otherwise process data in response thereto.

The server(s) may also be capable of executing programs or scripts in response to requests from user devices, such as by executing one or more Web applications that may be implemented as one or more scripts or programs written in any programming language, such as Java, C, C#or C++ or any scripting language, such as Perl, Python or TCL, as well as combinations thereof. The server(s) may also include database servers, including without limitation those commercially available from Oracle, Microsoft, Sybase, Apache Solr Postgres database, and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, a handset or hand-held controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   at least one computing processor; and
   memory including instructions that, when executed by the at least one computing processor, enable the computing system to:
   receive a request to view content associated with a first location in a three-dimensional virtual environment and a second location in the three-dimensional virtual environment, the first location associated with a first view of the content for a first orientation within the three-dimensional virtual environment, the second location associated with a second view of the content for a second orientation within the three-dimensional virtual environment;
   display the first view of the content based on the first location and the first orientation;
   display an overlay of a multi-dimensional reference element, the multi-dimensional reference element operable to provide a first visual indication of the first location in the three-dimensional virtual environment and the first orientation for viewing the content within the three-dimensional virtual environment;
   display the second view of the content based on the second location and the second orientation, the second view of the content being different from the first view of the content; and
   update the overlay of the multi-dimensional reference element based on the second view of the content to provide a second visual indication of the second location in the three-dimensional virtual environment and the second orientation for viewing the content within the three-dimensional virtual environment.

2. The computing system of claim 1, wherein the instructions when executed by the at least one computing processor further enable the computing system to:
   control one of the first view or the second view of the content using the multi-dimensional reference element, the multi-dimensional reference element including controls to pause the content, forward the content, or rewind the content.

3. The computing system of claim 1, wherein the instructions when executed by the at least one computing processor further enable the computing system to:
   receive a user request to add a third location, remove one of the first location or the second location, or update an order of the first location and the second location.

4. The computing system of claim 1, wherein at least one of the first location or the second location is associated with one of a play state or a paused state, and wherein the play state indicates the content is playing and the paused state indicates the content is paused.

5. The computing system of claim 1, wherein at least one of the first location or the second location is associated with information to associate first coordinates of a first coordinate system associated with one of the first location or the second location in the three-dimensional virtual environment to second coordinates of a second coordinate system associated with a physical environment.

6. The computing system of claim 1, wherein the instructions, when executed by the at least one computing processor, further enables the computing system to:
   receive an utterance that includes a message portion and a command portion;
   generate text based at least in part on the message portion; and
   generate a message based at least in part on the command portion, the message including the text.

7. The computing system of claim 6, wherein the instructions, when executed by the at least one computing processor, further enables the computing system to:
   associate the message with one of a position in the three-dimensional virtual environment, a virtual object in the three-dimensional virtual environment, or with a location link, wherein the message is viewable within the three-dimensional virtual environment.

8. The computing system of claim 1, wherein the instructions, when executed by the at least one computing processor, further enables the computing system to:
   generate a plurality of location links by one of a virtual object or in response to a user interaction; and
   enable access to the content associated with the plurality of location links.

9. A computer-implemented method, comprising:
   receiving a request to view content associated with a first location in a three-dimensional virtual environment and a second location in the three-dimensional virtual environment, the first location associated with a first view of the content for a first orientation within the three-dimensional virtual environment, the second location associated with a second view of the content for a second orientation within the three-dimensional virtual environment;
   displaying the first view of the content based on the first location and the first orientation;
   displaying an overlay of a multi-dimensional reference element, the multi-dimensional reference element operable to provide a first visual indication of the first location in the three-dimensional virtual environment and the first orientation for viewing the content within the three-dimensional virtual environment;
   displaying the second view of the content based on the second location and the second orientation, the second view of the content being different from the first view of the content; and
   updating the overlay of the multi-dimensional reference element based on the second view of the content to provide a second visual indication of the second location in the three-dimensional virtual environment and the second orientation for viewing the content within the three-dimensional virtual environment.

10. The computer-implemented method of claim 9, further comprising:
    receiving a user request to add a third location, remove one of the first location or the second location, or update an order of the first location and the second location.

11. The computer-implemented method of claim 9, wherein at least one of the first location or the second location is associated with one of a play state or a paused state, and wherein the play state indicates the content is playing and the paused state indicates the content is paused.

12. The computer-implemented method of claim 9, wherein at least one of the first location or the second location is associated with information to associate first coordinates of a first coordinate system associated with one of the first location or the second location in the three-dimensional virtual environment to second coordinates of a second coordinate system associated with a physical environment.

13. The computer-implemented method of claim 9, further comprising:
   receiving an utterance that includes a message portion and a command portion;
   generating text based at least in part on the message portion; and
   generating a message based at least in part on the command portion, the message including the text.

14. The computer-implemented method of claim 13, further comprising:
   associating the message with one of a position in the three-dimensional virtual environment, a virtual object in the three-dimensional virtual environment, or with a location link, wherein the message is viewable within the three-dimensional virtual environment.

15. The computer-implemented method of claim 9, further comprising:
   generating a plurality of location links by one of a virtual object or in response to a user interaction; and
   enabling access to content associated with the plurality of location links.

16. A non-transitory computer readable storage medium storing one or more sequences of instructions executable by one or more processors to perform a set of operations comprising:
   receive a request to view content associated with a first location in a three-dimensional virtual environment and a second location in the three-dimensional virtual environment, the first location associated with a first view of the content for a first orientation within the three-dimensional virtual environment, the second location associated with a second view of the content for a second orientation within the three-dimensional virtual environment;
   display the first view of the content based on the first location and the first orientation;
   display an overlay of a multi-dimensional reference element, the multi-dimensional reference element operable to provide a first visual indication of the first location in the three-dimensional virtual environment and the first orientation for viewing the content within the three-dimensional virtual environment;
   display the second view of the content based on the second location and the second orientation, the second view of the content being different from the first view of the content; and
   update the overlay of the multi-dimensional reference element based on the second view of the content to provide a second visual indication of the second location in the three-dimensional virtual environment and the second orientation for viewing the content within the three-dimensional virtual environment.

17. The non-transitory computer readable storage medium of claim 16, further comprising instructions executed by the one or more processors to perform the set of operations of:
   receive a user request to add a third location, remove one of the first location or the second location, or update an order of the first location and the second location.

18. The non-transitory computer readable storage medium of claim 16, further comprising instructions executed by the one or more processors to perform the set of operations of:
   generate a plurality of location links by one of a virtual object or in response to a user interaction; and
   enable access to content associated with the plurality of location links.

* * * * *